United States Patent [19]

Steinberg et al.

[11] Patent Number: 5,690,295
[45] Date of Patent: Nov. 25, 1997

[54] MASS BODY DRIVE FOR A ROTATIONAL TENSIONING DEVICE

[75] Inventors: Matthias Steinberg, Elsmhorn; Jörg Barckmann, Tornesch-Ahrenlohe, both of Germany

[73] Assignee: Autoliv Development AB, Vargarda, Sweden

[21] Appl. No.: 691,266

[22] Filed: Aug. 2, 1996

[30] Foreign Application Priority Data

Aug. 2, 1995 [DE] Germany ............... 195 28 385.6

[51] Int. Cl.⁶ .................................................. B60R 22/46
[52] U.S. Cl. ................................................... 242/374
[58] Field of Search ................. 242/374; 297/475–480; 280/806, 807; 60/905

[56] References Cited

U.S. PATENT DOCUMENTS

| | | | |
|---|---|---|---|
| 4,381,084 | 4/1983 | Fohl | 242/374 |
| 4,442,674 | 4/1984 | Fohl | 60/632 |
| 4,444,010 | 4/1984 | Bendler | 242/374 |

FOREIGN PATENT DOCUMENTS

| | | | |
|---|---|---|---|
| 2420241 | 2/1980 | France | 242/374 |
| 2931164 | 2/1981 | Germany . | |

*Primary Examiner*—John M. Jillions
*Attorney, Agent, or Firm*—Robert W. Becker & Associates

[57] ABSTRACT

A rotational tensioning device for a safety belt of a motor vehicle has a reeling device with reeling shaft and a drive wheel connected to the reeling shaft. The drive wheel has a circumference with semi-spherical recesses. A channel, having a first and a second end, is positioned in a plane parallel to the drive wheel. It extends at least over a portion of the circumference of the drive wheel. Spherical mass bodies are contained in the channel. A gas generator is connected to the first end of the channel, wherein, upon activation of the gas generator, a gas is released into the channel for accelerating the spherical mass bodies in the channel and driving the spherical mass bodies through the channel into the semi-spherical recesses to thereby drive the drive wheel and the reeling shaft in a direction of winding of the safety belt. A drive piston, for driving the spherical mass bodies, consists of two of the spherical mass bodies fixedly connected to one another to form a twin ball. The drive piston is positioned within the first end of the channel.

5 Claims, 1 Drawing Sheet

MASS BODY DRIVE FOR A ROTATIONAL TENSIONING DEVICE

BACKGROUND OF THE INVENTION

The present invention relates to a rotational tensioning device for a safety belt, especially in motor vehicles, with a safety belt reeling device having a safety belt reeling shaft that upon release of the rotational tensioner coupled thereto is rotated in the winding direction of the safety belt, whereby the safety belt reeling shaft has coordinated therewith a drive wheel in the plane of which the housing of the safety belt reeling device comprises a channel surrounding the drive wheel over at least a portion of its circumference for guiding therethrough mass bodies acting on the drive wheel and accelerated within the channel as a drive means.

A rotational tensioning device with the aforementioned features is known in general from German Offenlegungsschrift 29 31 164. In the known rotational tensioning device the safety belt reeling shaft is provided with a drive wheel whereby the housing in the plane of the drive wheel comprises a channel surrounding the drive wheel over a portion of its circumference. Into this channel mass bodies are driven by a pyrotechnical drive from a tube which is arranged tangentially to the drive wheel. These mass bodies, due to the frictional connection with the drive wheel provided for this purpose with a circumferential profiled groove, drive the drive wheel when passing through the channel. According to one embodiment, the mass bodies can be in the form of balls made of a correspondingly hard plastic material. At the end of the channel an outlet opening for the mass bodies may be provided via which they can exit from the channel to be received in a corresponding receptacle.

The known rotational tensioning device has the disadvantage that the drive is based on friction. This causes, on the one hand, a considerable loss of energy, and on the other hand, it is difficult to adjust the profiled groove and the mass bodies such that a defined frictional connection is provided and that the mass bodies will not jam or slide without transmitting force. Furthermore, it is disadvantageous that the impact of the hard mass bodies on the drive wheel may cause mutual blockage between the circumference of the drive wheel and the mass bodies within the channel, having only minimal play for sealing purposes, so that the effectiveness of the activated drive may be impaired.

It is therefore an object of the present invention to improve a rotational tensioning device of the aforementioned kind such that the transmission of the drive energy provided by the mass bodies onto the rotation of the safety belt reeling shaft is improved.

SUMMARY OF THE INVENTION

A rotational tensioning device for a safety belt of a motor vehicle according to the present invention is primarily characterized by:

A reeling device with reeling shaft;

A drive wheel connected to the reeling shaft, the drive wheel having a circumference with semi-spherical recesses;

A channel, having a first and a second end, positioned in a plane parallel to the drive wheel and extending at least over a portion of the circumference of the drive wheel;

Spherical mass bodies contained in the channel;

A gas generator connected to the first end of the channel, wherein upon activation of the gas generator a gas is released into the channel for accelerating the spherical mass bodies in the channel and driving the spherical mass bodies through the channel into the semi-spherical recesses to thereby drive the drive wheel and the reeling shaft in a direction of winding of the safety belt;

A drive piston for driving the spherical mass bodies comprised of two of the spherical mass bodies fixedly connected to one another to form a first twin ball and positioned within the first end of the channel.

Advantageously, one of the spherical mass bodies of the first twin ball comprises a seal resting sealingly at the inner wall of the channel.

Preferably, at the second end of channel a second twin ball comprised of two of the spherical mass bodies fixedly connected to one another is provided and one of the spherical mass bodies of the second twin ball comprises a seal resting sealingly at the inner wall of the channel.

Expediently, the one spherical mass body of the second twin ball comprising the seal has a circumferential groove for receiving the seal.

Advantageously, the spherical mass body of the first twin ball comprising the seal has a circumferential groove for receiving the seal.

According to the present invention, the drive wheel at its outer circumference is provided with cup-shaped recesses in the form of semi-spherical cups for receiving the spherical mass bodies in the form of balls and the channel facing the gas generator that acts as the drive means has inserted therein a twin ball comprised of two of the mass bodies connected to one another as a drive piston. The invention has the advantage that with the recesses provided at the circumference of the drive wheel a positive-locking connection of the mass bodies is ensured. The force transmission between the mass bodies and the drive wheel for the safety belt reeling shaft is thus considerably improved. Thus, an exact axial or lateral guiding of the mass bodies within the drive wheel as well as a synchronous running of the mass bodies within the drive wheel is realized. By receiving the mass bodies within the cup-shaped recesses, it is simultaneously possible to provide for a best possible introduction of the first mass body into the drive wheel, respectively, to the circumference of the drive wheel after activation of the drive.

With the embodiment of the drive piston as a twin ball it is advantageously realized that the drive piston can simultaneously act as a drive body on the drive wheel without jamming of the drive piston at the drive wheel. By embodying the drive piston as a twin ball, it is ensured that the mass body which is provided with the seal cannot rotate under the effect of the pressure so that the seal is always resting at the inner wall of the channel. A further advantage is that with the defined position of the twin ball within the channel of the tubular housing a return of the twin ball into the channel after completion of the tensioning movement is possible. Such a return is necessary for an embodiment of the rotational tensioning device in which in the context of a force limitation subsequent to the tensioning action a return of the reeling shaft in a direction counter to the tensioning direction is required. For such a force limitation with rotation of the reeling shaft in direction of removal of the safety belt, the rotational tensioner may not impede the rotation of the reeling shaft.

According to a further embodiment of the invention, it may be provided that in the oppositely arranged end of the channel a further twin ball with seal is arranged. This is advantageous because at the exit side no special component must be provided and at the same time the size of the device is minimized because the twin ball at the exit side can also act as a drive body.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

Figure 2:
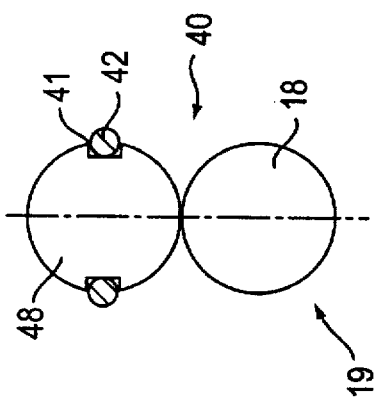
FIG. 2 shows the drive piston in the form of a twin ball in a detailed representation.
Figure 1:
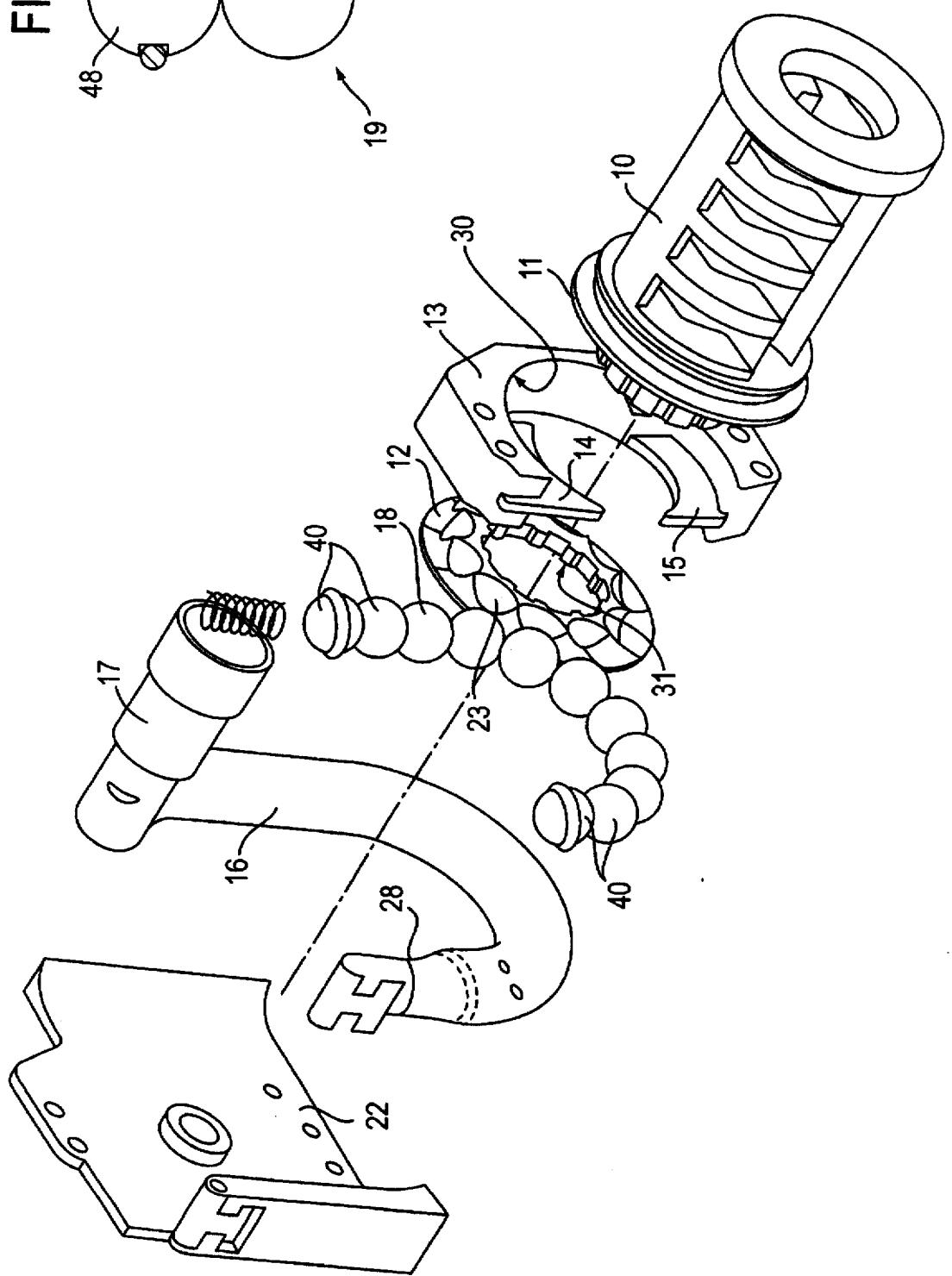
FIG. 1 is a safety belt reeling shaft with rotational tensioner in a perspective view.

The present invention will now be described in detail with the aid of several specific embodiments utilizing FIGS. 1 and 2.

The safety belt reeling shaft 10 is rotationally supported in a safety belt reeling housing which is, in general, U-shaped. In order to rotate the safety belt reeling shaft in a direction for tensioning the safety belt wound thereon, a pyrotechnically activated drive is provided which is comprised of two drive wheel halves 11, 12 of a drive wheel whereby the drive wheel half 11 in the shown embodiment is fixedly connected to the safety belt reeling shaft 10. As can be seen in FIG. 1, the second drive wheel half 12 is mounted such that it is placed against the first drive wheel half 11 and connected thereto with a toothing 31. Between the two drive wheel halves 11, 12 a guide blade box 13 is arranged within the housing of the safety belt reeling device. Blade-shaped guides 14, 15 of the box 13 are positioned between the two drive wheel halves 11, 12. The inner circumference 30 of the box 13 encloses the outer circumference of the drive wheel 11, 12.

Within the plane of the guide blade box 13, respectively, of the drive wheel 11, 12 a curved tubular housing 16 is arranged having an inner channel in which spherical mass bodies 18 in the form of balls are stored which serve to accelerate the drive wheel 11, 12. At one end of the tubular housing 16 a gas generator receiving means 17 is arranged in which a drive means in the form of a gas generator, not shown in detail, is arranged. Upon actuation, gas is released and drives the mass bodies 18 out of the tubular housing 16. For this purpose, the tubular housing 16 facing the gas generator receiving means 17 has arranged therein a drive piston while the opposite end of the tubular housing is provided with a closure. Onto the tubular housing 16 a cover plate 22 is placed which is connected to the non-represented U-leg of the safety belt housing and which supports and secures the tubular housing 16 and the guide blade box 13.

The drive piston 19 is in the form of a twin ball 40. It is comprised of two individual mass bodies 18 connected to one another. For providing a seal the mass body 18 of the twin ball 40 facing the pyrotechnical gas generator comprises a groove 41 in which a sealing ring 42 is provided, shown in detail in FIG. 2. With this embodiment of the twin ball it is ensured that the orientation of the twin ball 40 within the channel of the tubular housing 16 remains the same upon movement of the twin ball 40 and that a rotation of the ball 18 supporting the seal 42 is prevented. In a rotated position gas could pass the ball and thus impair the drive action. As can be seen in FIG. 2, such a twin ball 40 is also arranged at the other end of the channel in order to provide a tube closure. Thus, at the exit side of the channel there is also provided a seal that, however, does not disturb the movement of the tubular closure within the drive wheel.

Upon activation of the gas generator received within the gas generator receiving means 17, the released gasses drive the mass bodies 18 stored within the tubular housing 16 out of the tubular housing whereby the mass bodies 18 in the open inlet area 28 are positive-lockingly driven into the cup-shaped recesses 23 of the drive wheel 11, 12. The blade-shaped guide 15 of the guide blade box 13 provides a supporting guiding action. The mass bodies 18 which contact one another are sequentially driven in the radial direction into the drive wheel 11, 12 and thus force the drive wheel 11, 12 in rotation so that the safety belt reeling shaft 10 performs the desired rotational movement for the tensioning action. After passing along with the drive wheel, the mass bodies 18 are removed and caught by the blade-shaped guide 14 acting as a deflector. The blade-shaped guides 14, 15 prevent a deflection of the individual mass bodies 18 from the desired tangential course within the drive wheel 11, 12 which ensures an optimal force transmission. In order to ensure the function of the safety belt reeling device after a tensioning action, a clean separation of the mass bodies 18 from the drive wheel 11, 12 is performed by the blade-shaped guide 14 acting as a stripper plate.

The present invention is, of course, in no way restricted to the specific disclosure of the specification and drawings, but also encompasses any modifications within the scope of the appended claims.

What we claim is:

1. A rotational tensioning device for a safety belt of a motor vehicle, said tensioning device comprising:

a reeling device with reeling shaft;

a drive wheel connected to said reeling shaft, said drive wheel having a circumference with semi-spherical recesses;

a channel, having a first and a second end, positioned in a plane parallel to said drive wheel and extending at least over a portion of said circumference of said drive wheel;

spherical mass bodies contained in said channel;

a gas generator connected to said first end of said channel, wherein upon activation of said gas generator a gas is released into said channel for accelerating said spherical mass bodies in said channel and driving said spherical mass bodies through said channel into said semi-spherical recesses to thereby drive said drive wheel and said reeling shaft in a direction of winding the safety belt;

a drive piston, for driving said spherical mass bodies, comprised of two of said spherical mass bodies fixedly connected to one another to form a first twin ball and positioned within said first end of said channel.

2. A tensioning device according to claim 1, wherein one of said spherical mass bodies of said first twin ball comprises a seal resting sealingly at an inner wall of said channel.

3. A tensioning device according to claim 2, wherein at said second end of said channel a second twin ball comprised of two of said spherical mass bodies fixedly connected to one another is provided and wherein one of said spherical mass bodies of said second twin ball comprises a seal resting sealingly at an inner wall of said channel.

4. A tensioning device according to claim 3, wherein said one spherical mass body of said second twin ball comprising said seal has a circumferential groove for receiving said seal.

5. A tensioning device according to claim 2, wherein said one spherical mass body of said first twin ball comprising said seal has a circumferential groove for receiving said seal.

* * * * *